US012760827B2

(12) United States Patent
Edwards

(10) Patent No.: US 12,760,827 B2
(45) Date of Patent: Oct. 13, 2026

(54) AIRCRAFT CONNECTOR FOR FLUID TRANSFER

(71) Applicant: AIRBUS OPERATIONS LIMITED, Bristol (GB)

(72) Inventor: Henry Edwards, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 85 days.

(21) Appl. No.: 18/621,701

(22) Filed: Mar. 29, 2024

(65) Prior Publication Data

US 2024/0328557 A1 Oct. 3, 2024

(30) Foreign Application Priority Data

Mar. 31, 2023 (GB) .................................... 2304778

(51) Int. Cl.
*F16L 37/56* (2006.01)
*B64D 37/00* (2006.01)

(52) U.S. Cl.
CPC ............ *F16L 37/56* (2013.01); *B64D 37/005* (2013.01)

(58) Field of Classification Search
CPC ....... B64D 37/14; B64D 37/005; F16L 37/56; F16L 37/565
USPC ......................... 141/59, 231, 319; 137/899.2
See application file for complete search history.

(56) References Cited

U.S. PATENT DOCUMENTS 2,588,869 A * 3/1952 Pinaire .................. B64D 39/00 137/577
2,628,850 A 2/1953 Summerville
3,171,448 A * 3/1965 Fromm ................ F16L 37/565 141/346
3,218,134 A 11/1965 Walsh
3,604,478 A * 9/1971 Gowens .................. B67D 7/42 141/206
4,157,104 A * 6/1979 Lofquist, Jr. ........... B67D 7/54 220/746
5,765,610 A * 6/1998 Brown .................. B64D 37/16 141/346
9,366,370 B2 6/2016 Courpet et al.
9,506,587 B2 * 11/2016 Petit ....................... F16L 25/01
2004/0207197 A1 10/2004 Hoang et al.
2012/0024418 A1 2/2012 French
2019/0330048 A1 10/2019 Sever et al.
2021/0039803 A1 2/2021 Barnes et al.

FOREIGN PATENT DOCUMENTS

CN 207635343 U 7/2018
KR 20150001763 U 5/2015
WO 20100004321 A1 1/2010

OTHER PUBLICATIONS

Combined Search and Examination Report for GB Application No. 2304778.0 dated Sep. 12, 2023, 5 pages.
Extended European Search Report for Application No. EP 24157673. 5, eight pages, dated Aug. 7, 2024.

* cited by examiner

*Primary Examiner* — Timothy L Maust
(74) *Attorney, Agent, or Firm* — Nixon & Vanderhye, PC

(57) ABSTRACT

An aircraft having a port over which a first connector is mounted for connecting to a second connector to transfer fluid to and/or from the aircraft is disclosed. The first connector includes a first fluid path extending from the port towards an aircraft fluid tank and a second, different, fluid path which extends from the port towards an aircraft fluid tank.

18 Claims, 12 Drawing Sheets

AIRCRAFT CONNECTOR FOR FLUID TRANSFER

CROSS RELATED APPLICATION

This application claims priority to United Kingdom Patent Application GB 2304778.0, filed Mar. 31, 2023, the entire contents of which is hereby incorporated by reference.

FIELD OF THE INVENTION

The present invention relates to an aircraft, a kit of parts, and a method of transferring fluids to and/or from an aircraft.

BACKGROUND OF THE INVENTION

Jet fuels are the most common aircraft fuels. There are recent advances that supplement these conventional jet fuels with similar biofuels, such as sustainable aviation fuel (SAF). There are also ambitions to use other fuels such as ammonia and hydrogen, with combinations of these fuels expected to have respective advantages in different flight phases. Historical examples of dual-fuel aircraft have included the B57 Canberra as part of NACA's project Bee, in which kerosene-based fuel and hydrogen fuel were used alternately during flight.

In many cases, the employment of dual-fuel aircraft will require substantial changes to existing designs and procedures to account for fuels that may not be compatible in terms of storage or combustion.

SUMMARY OF THE INVENTION

A first aspect of the invention provides an aircraft comprising a port over which a first connector is mounted for connecting to a second, complementary connector to transfer fluid to and/or from the aircraft, the first connector including a first fluid path extending from the port towards an aircraft fluid tank and a second, different, fluid path extending from the port towards an aircraft fluid tank.

A port is defined as an opening in the side of the aircraft.

With this arrangement, multiple fluids can be transferred to and/or from the aircraft with only a single connector pair. This reduces the number of couplings needed for, e.g., refuelling a multi-fuel aircraft.

Optionally, the cross-section of the first fluid path is different to the cross-section of the second fluid path.

Optionally, the first fluid path is concentric with the second fluid path.

Optionally, the first fluid path is defined by a first conduit of the first connector, and the second fluid path is defined by a second conduit of the first connector, wherein the first conduit extends through an outer wall of the second conduit.

Optionally, the first connector comprises an alignment pin or an alignment port for mating with a corresponding alignment port or alignment pin of a second connector so as to align the connectors.

Optionally, the first fluid path extends to a first aircraft fluid tank and the second fluid path extends to a second aircraft fluid tank.

Optionally, the first and/or second aircraft fluid tank is an aircraft fuel tank.

Optionally, the first fluid path and the second fluid path extend to a common fluid tank.

Optionally, the first connector includes a third fluid path extending to an aircraft fluid tank. The third fluid path may extend to a third fuel tank, or the third fluid path may extend to the same fuel tank as one of the first and second fluid paths.

A further aspect of the invention provides a kit of parts comprising the aircraft of any preceding claim and a second, complementary connector configured to releasably connect to the first connector to form a connection, the second connector including a first fluid path that upon connection to the first connector extends from the first fluid path of the first connector towards an external fluid tank, and a second fluid path that upon connection to the first connector extends from the second fluid path of the first connector towards an external fluid tank. The first and second fluid paths may extend to a common fluid tank or separate fluid tanks.

Optionally, the first connector and the second connector are configured such that: the first fluid path of the first connector is unable to form a fluidically sealed path with the second fluid path of the second connector, and the second fluid path of the first connector is unable to form a fluidically sealed path with the first fluid path of the second connector.

This arrangement ensures the connection is always formed correctly, with no risk of cross-flow between the respective fluid paths.

Optionally, the second connector is a male connector and the first connector is a female connector configured to receive the second connector.

Optionally, the connection includes a locking mechanism configured to releasably fix the second connector relative to the first connector.

A further aspect of the invention provides a method of transferring fluids to and/or from an aircraft, comprising: providing an aircraft having a port over which is mounted a first connector, the first connector connected to a second connector to form a connection, the first connector including a first fluid path extending from the port towards an aircraft fluid tank and a second, different, fluid path extending from the port towards an aircraft fluid tank; transferring a first fluid through the first fluid path to transfer the first fluid to or from the aircraft; and transferring a second fluid through the second fluid path to transfer the second fluid to or from the aircraft. The first fluid may be different to the second fluid.

The method optionally comprises transferring the first fluid through the first fluid path to or from a first aircraft fuel tank, and transferring the second fluid through the second fluid path to or from a second aircraft fuel tank.

The method optionally comprises transferring the first fluid through the first fluid path to or from an aircraft fuel tank, and transferring the second fluid through the second fluid path to or from the aircraft fuel tank.

Optionally, wherein the first fluid is one of a first aviation fuel, a second aviation fuel, fuel additives, oxygen-depleted air, a tracer gas, hydraulic fluid, engine oil, or water, and wherein the second fluid is a different one of a first aviation fuel, a second aviation fuel, fuel additives, oxygen depleted air, a tracer gas, hydraulic fluid, engine oil, or water.

Optionally, wherein the first aviation fuel and second aviation fuels comprise one of a jet fuel, sustainable aviation fuel, ammonia, liquid hydrogen, and gaseous hydrogen.

Optionally, the method comprises: transferring water through the first fluid path towards an aircraft water tank, and transferring waste through the second fluid path from an aircraft waste tank.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
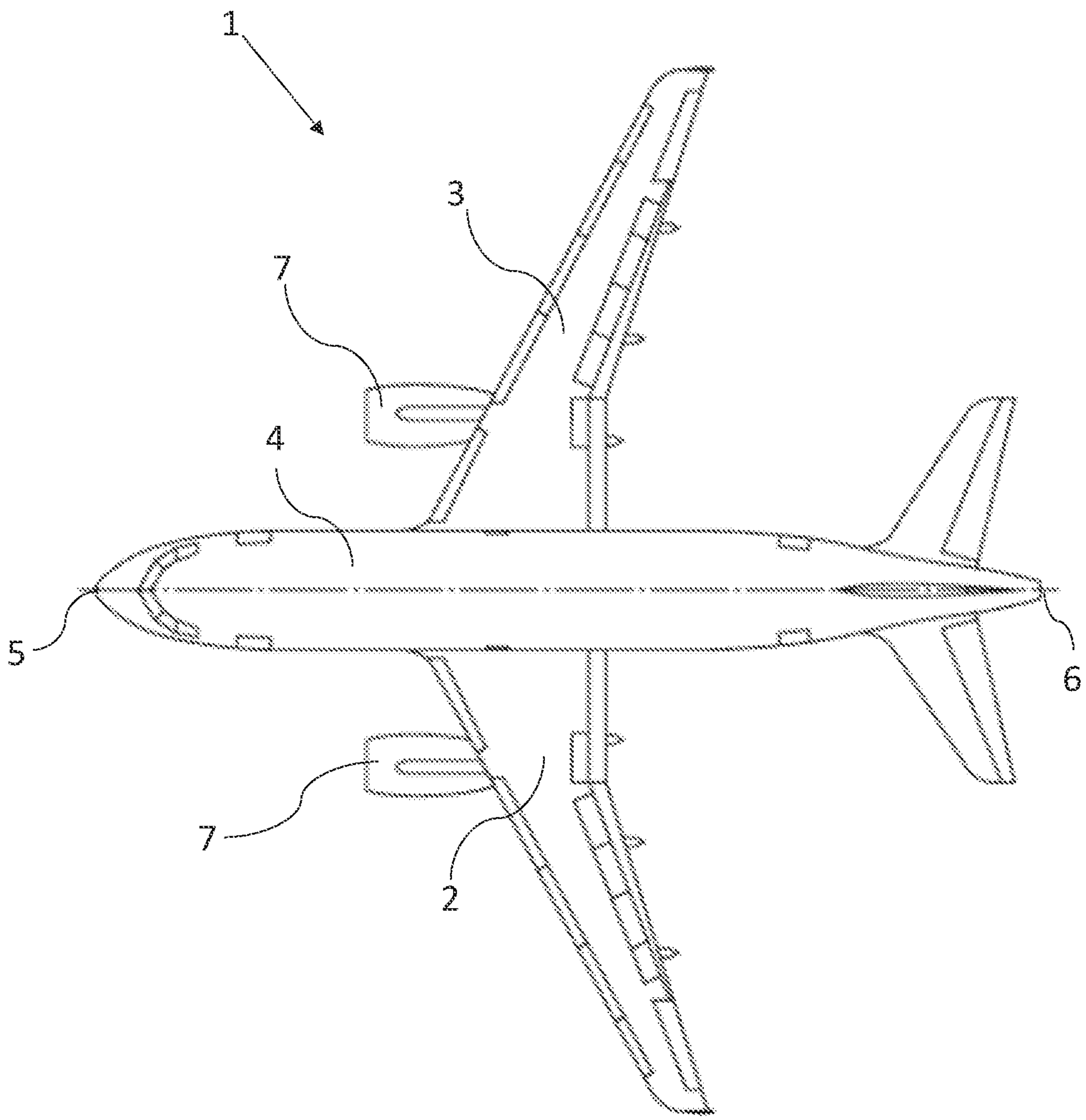
FIG. 1 shows an aircraft.

FIG. 1 shows an aircraft 1 with port and starboard fixed wings 2, 3, engines 7, a fuselage 4 with a nose end 5 and a tail end 6. The aircraft 1 is a typical jet passenger transonic transport aircraft although the invention is applicable to a wide variety of aircraft types, including commercial, military, passenger, cargo, jet, propeller, general aviation, etc. with any number of engines attached or integral to the wings or fuselage.

Figure 2:
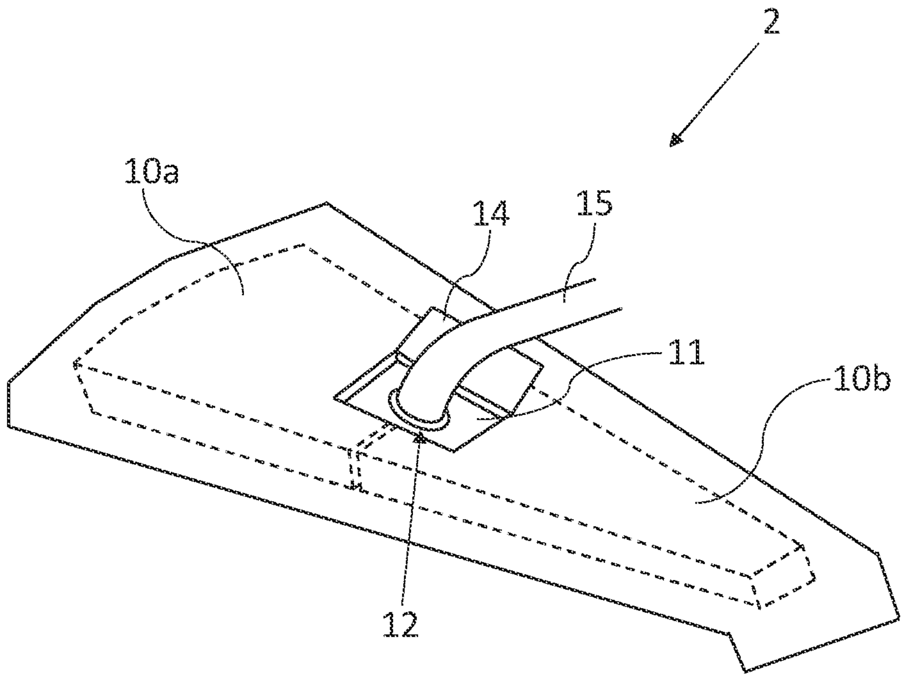
FIG. 2 shows the refuelling on a fuel tank in a port side wing.

The aircraft 1 includes one or more fuel tanks 10*a*, 10*b* into which a quantity of fuel is transferred sufficient to complete the next flight, such as shown in FIG. 2 where two fuel tanks 10*a*, 10*b* are shown inside the port wing 2. The fuel is supplied through a refuelling port 12. The refuelling port 12 is located on a refuelling panel 11. The refuelling panel 11 is a panel mounted to the aircraft structure that interfaces with the fuel tank(s) 10*a*, 10*b*, and may include various gauges and switches (not shown), as required, to monitor the refuelling process and the fuel tank 10.

The refuelling panel 11 and refuelling port 12 are located adjacent an access hatch 14 of the aircraft 1. The hatch 14 may form an outer aerodynamic surface of the aircraft 1, with the hatch 14 shown in an open position in FIG. 2 so as to expose the refuelling port 12.

The refuelling port 12 is located adjacent a lower cover of the aircraft wing 2, however it will be appreciated that the refuelling port 12 (and access hatch 14 when applicable) may be located in any suitable location on the wings 2, 3, fuselage 4, or on a fairing (not shown).

In the closed position, the hatch 14 covers the refuelling port 12, such that the refuelling port 12 has a central axis that is substantially normal to the outer aerodynamic surface of the aircraft 1. The hatch 14 provides convenient external access to the refuelling port 12 so that fuel can be transferred to the fuel tank 10 via a refuel hose 15.

There is a desire to minimise the time required to refuel aircraft 1 due to refuelling being a significant contributor to the time required for aircraft 1 to remain grounded between flights. This desire is only expected to increase if aircraft move towards the use of multiple fuels.

Figure 3:
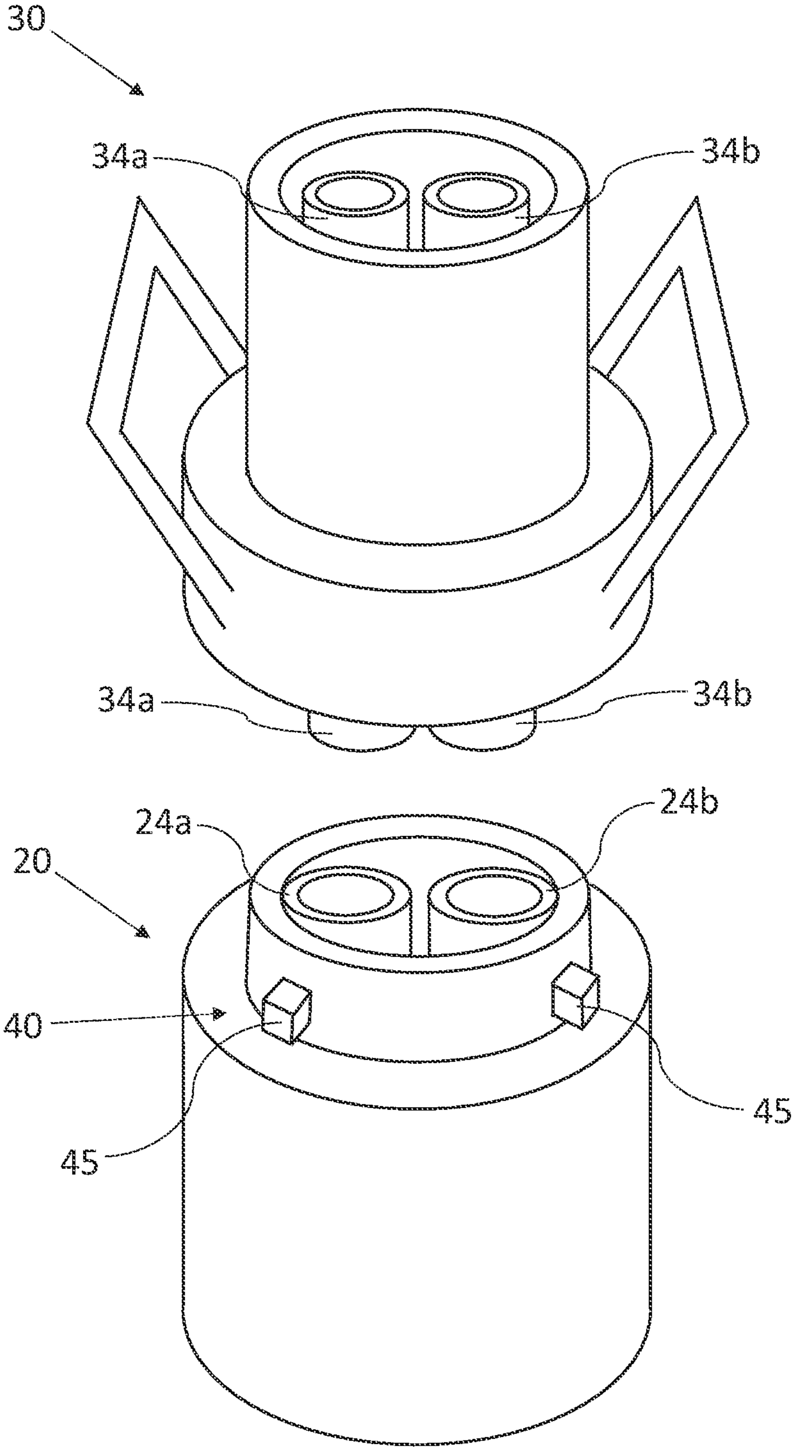
FIG. 3 shows a first connector and second connector according to an example of the present invention.

FIG. 3 shows a first connector 20 that is arranged to mount over the refuelling port 12 and a second, complementary connector 30 that is arranged to releasably connect to the first connector 20 to form a connection. The connectors 20, 30 each comprise one half of a locking mechanism 40 configured to releasably fix the second connector 30 to the first connector 20. The connection is formed by a quick release mechanism. The example shown in FIG. 3 is a rotation-based quick release mechanism in which tabs 45 on the first connector 20 are configured to engage with respective channels (not shown) on the second, complimentary connector 30, although it will be appreciated that other suitable quick release mechanisms are known such as pressure-based and clamping-based quick release mechanisms.

Figure 13:
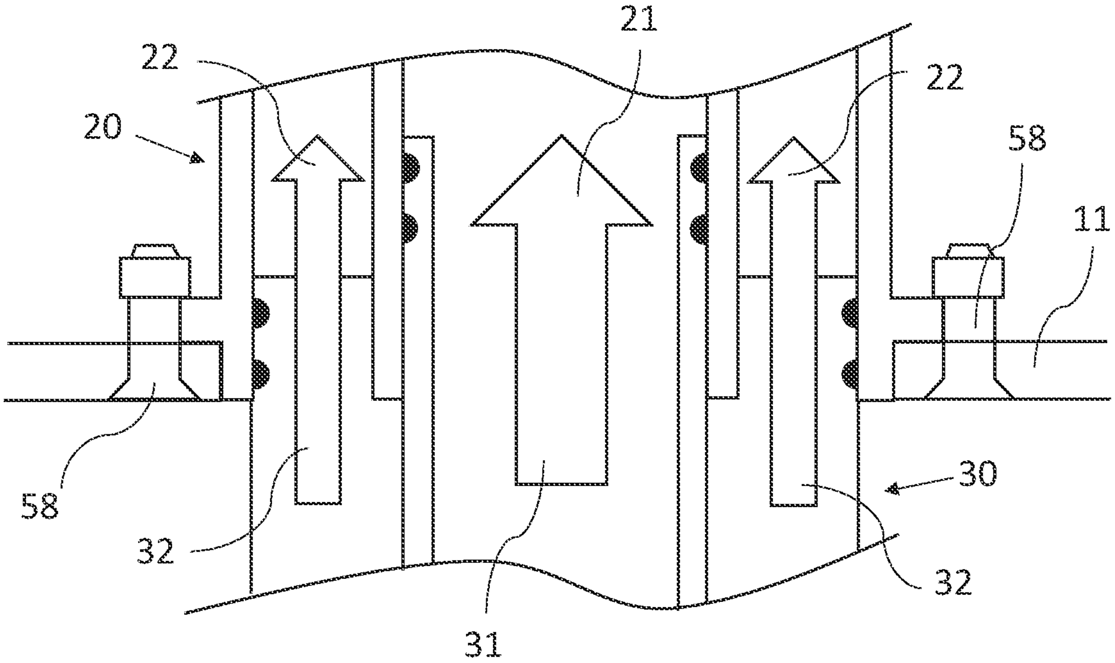
FIG. 13 shows the second connector inserted into the first connector.

The first connector 20 is typically a female connection configured to receive a male second connector 30, such that the second connector 30 is inserted into an aperture of the first connector 20. In this case, the first fluid paths 21, 31 may have different diameters, and similarly the second fluid paths 22, 32 may have different diameters, such that there is a step change in the cross-section of the channels across the connection (such as shown in FIG. 13).

Figure 4:
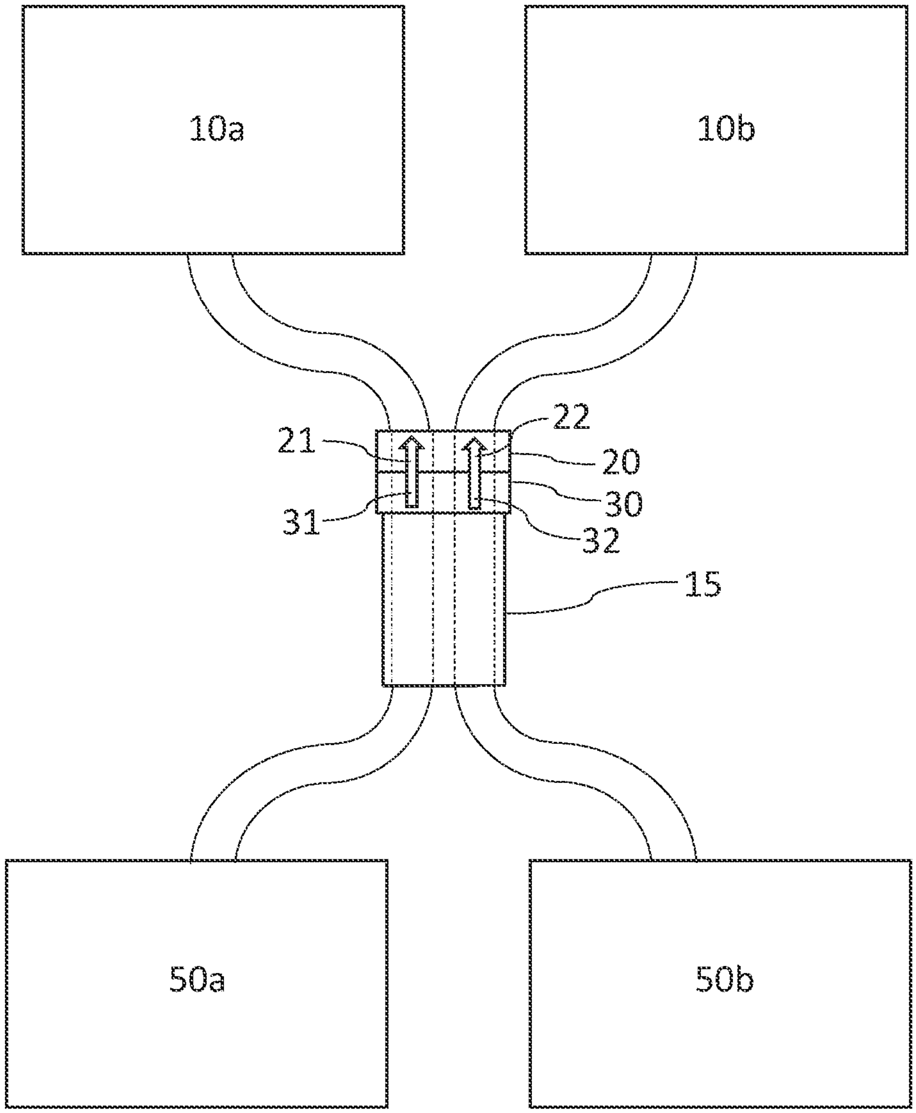
FIG. 4 shows a schematic diagram of a refuelling process through the connection of the first connector and second connector.

The first connector 20 and second connector 30 each define first and second fluid paths therethrough. In particular, the first connector 20 includes a first fluid path 21 extending towards a first fuel tank 10*a* and a second fluid path 22 extending towards a second fuel tank 10*b*, and the second connector 30 includes a first fluid path 31 extending towards a first external fuel tank 50*a* and a second fluid path 32 extending towards a second external fuel tank 50*b*. An example of this arrangement is shown schematically in FIG. 4.

In this example, the first fluid paths 21, 31 are each defined by a respective first conduit 24*a*, 34*a* and the second fluid paths 22, 32 are each defined by a respective second conduit 24*b*, 34*b* (See FIG. 3), although it will be appreciated that each fluid path 21, 22, 31, 32 may be defined by two or more conduits, as will be discussed in relation to subsequent examples.

In this manner, a single connection is formed that allows multiple aviation fuels to be transferred to the aircraft fuel tanks 10*a*, 10*b* from respective external fuel tanks 50*a*, 50*b*, with the external fuel tanks 50*a*, 50*b* (e.g. ground-based holding tanks) carrying the aviation fuel to be transferred to the aircraft 1. Refuelling a dual-fuel aircraft in this manner will provide considerable time savings over alternatives (such as using separate connections for each respective aviation fuel). In the example shown in FIG. 4, the flow of the respective aviation fuels is shown by the arrows, with the aviation fuels transferred to the respective tanks 10*a*, 10*b* simultaneously, although separate refuelling would be possible.

It will be understood that any suitable aviation fuel may be transferred through the connection, with a non-exhaustive list comprising jet fuel, sustainable aviation fuel (SAF), ammonia, liquid hydrogen, and gaseous hydrogen. In some examples, different compositions of aviation fuels may be transferred separately through the connection, with one example being Jet A and Jet A-1 aviation fuels.

Figure 5:
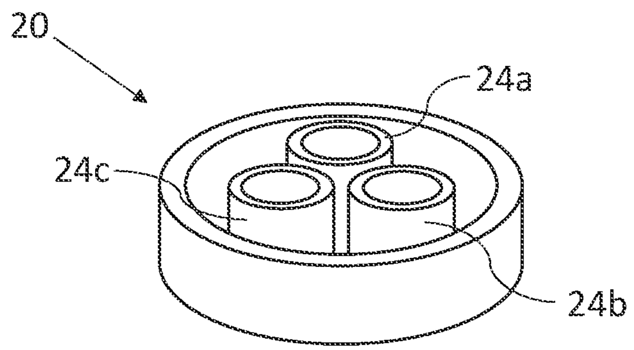
FIG. 5 shows a second example of a first connector.
Figure 6A:
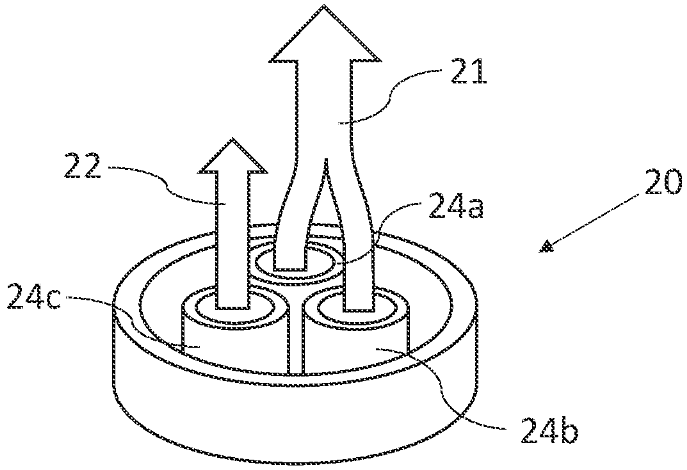
FIG. 6A shows the first connector of FIG. 5 defining two fluid paths.
Figure 6B:
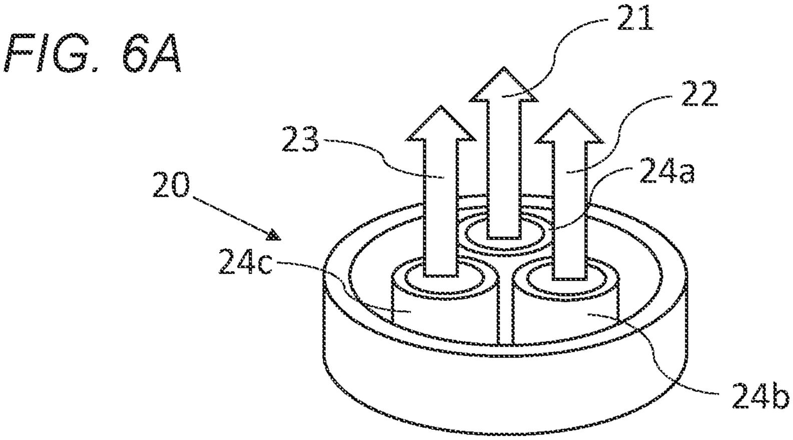
FIG. 6B shows the first connector of FIG. 5 defining three fluid paths.

The first connector 20 and second connector 30 may be arranged in various configurations. FIG. 5 shows an example in which the first connector 20 includes three conduits-a first, a second and a third conduit 24*a*, 24*b*, 24*c*. This may allow the first fluid path 21 to be defined by two conduits 24*a*, 24*b* to increase the total cross-sectional area of the first fluid path 21 extending to the first fuel tank 20*a* relative to the second fluid path 22 to the second fuel tank 20*b* (See FIG. 6A). Alternatively, a third fluid path 23 may be defined by the third conduit 24*c* such that a single connection can allow three fuels to be transferred to respective fuel tanks (See FIG. 6B).

The example described above requires careful alignment of the first connector 20 and second connector 30 to ensure that the first fluid path 21 of the first connector 20 aligns with the first fluid path 31 of the second connector 30, and similarly that the second fluid path 22 of the first connector 20 aligns with the second fluid path 32 of the second connector 30. In this way, the first fluid paths 21, 31 are fluidically sealed from the second fluid paths 22, 32.

Figure 7A:
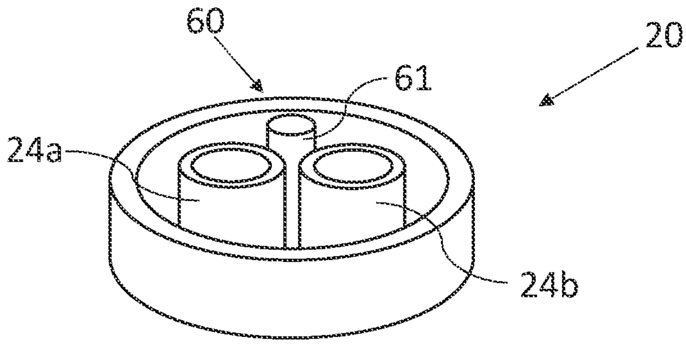
FIG. 7A shows a third example of a first connector.

In a further example shown in FIG. 7A, the first connector 20 and second connector 30 may each include one-half of an alignment feature 60 arranged to ensure the first connector 20 and second connector 30 are prevented from connecting incorrectly in such a manner that there is cross-over between the first and second fluid paths 21, 22, 31, 32 across the connection. The alignment feature 60 may include an alignment pin 61 and alignment port (not shown) that mate. In the example shown in FIG. 7A, the first connector 20 includes an alignment pin 61 configured to mate with an alignment port of the second connector 30, although the second connector 30 may alternatively include the alignment pin 61 and the first connector 20 the alignment port.

Figure 7B:
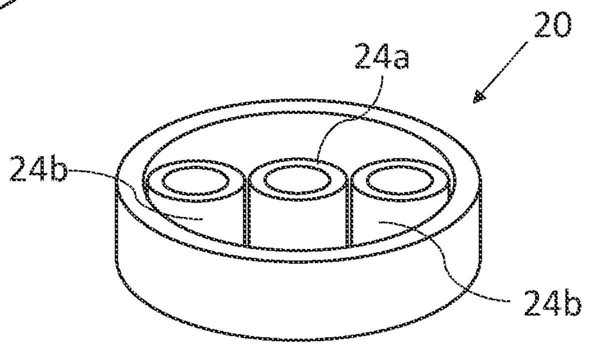
FIG. 7B shows a fourth example of a first connector.

In the example shown in FIG. 7B, a first, inner conduit 24*a* defines the first fluid path 21, whilst a pair of second, outer conduits 24*a* define the second fluid path 22. Providing respective conduits 24*a*, 24*b* spaced at different distances from the central axis of the first connector 20 ensures that incorrect connection to the second connector 30 is not possible. Although it will be appreciated that alignment may still be difficult due to the connection only being possible in two orientations (in this case at 180 degrees relative to each other). Each of these conduits 24*a*, 24*b* would also require an individual seal to ensure respective fluidically sealed fluid paths, therefore requiring additional seals compared to an example having two conduits.

Figure 7C:
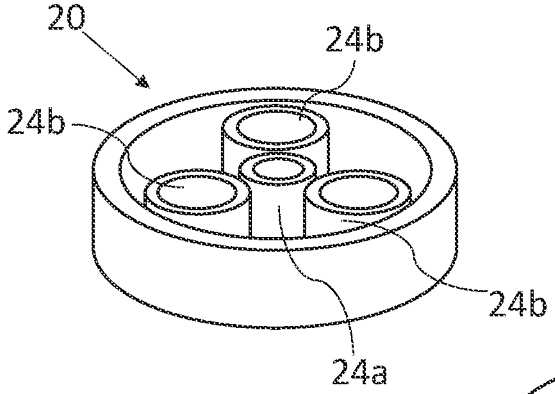
FIG. 7C shows a fifth example of a first connector.

FIG. 7C shows an example in which a first, inner conduit 24*a* defines the first fluid path 21, whilst three second, outer conduits 24*b* define the second fluid path 22. Three connectable orientations are thus provided (in this case at 120 degrees relative to each other), although the number of required seals is again increased.

Figure 7D:
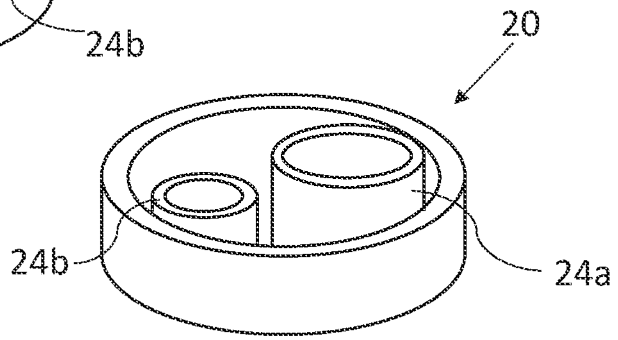
FIG. 7D shows a sixth example of a first connector.

FIG. 7D shows an example in which the first conduit 24*a* extends further from the mouth of the first connector 20 than the second conduit 24*b*. The first conduit 24*a* may extend beyond the mouth of the first connector 20 and/or the second conduit 24*b* may be level with or recessed below the mouth of the first connector 20. This design requires only two conduits, whilst preventing the connection being fully formed without the correct alignment of the respective conduits 24*a*, 24*b*. Even so, it may still be possible to incorrectly align the first connector 20 and second connector 30 such that a single fluid path is formed, for instance the first conduit 24*a* of the first connector 20 may be connected to the second conduit (not shown) of the second connector 30, whilst a gap remains between the second conduit 24*b* of the first connector 20 and the first conduit (not shown) of the second connector 30.

It will be noted that the cross-sections of the first and second conduits 24*a*, 24*b* shown in FIG. 7D are differently sized. The respective conduits 24*a*, 24*b* can be differently sized such that it is not possible to seal the first conduit 24*a* of the first connector 20 against the second conduit 34*b* of the second connector 30 (and similarly with the second conduit 24*b* of the first connector 20 and first conduit 34*a* of the second connector 30).

Figure 7E:
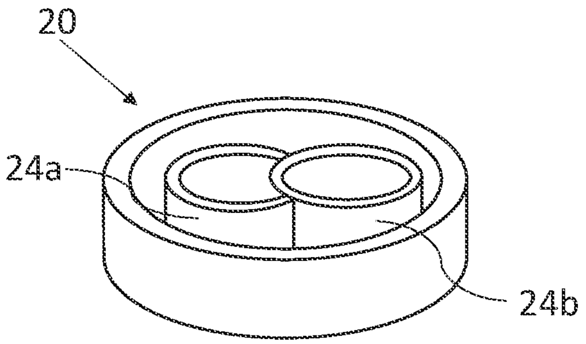
FIG. 7E shows a seventh example of a first connector.

FIG. 7E shows the profiles of the first and second conduits 24*a*, 24*b* merged. The different cross-sections of the first and second conduits 24*a*, 24*b* increase the utilisation of space within the first connector 20 and can prevent incorrect alignment, however challenges can be expected in providing an effective seal across the shared wall of the conduits 24*a*, 24*b*.

Each of the abovementioned examples requires the first connector 20 and second connector 30 to be fixed at a specified orientation. This requires the second connector 30 to be positioned precisely, increasing the time to correctly align the connectors 20, 30, and preventing relative rotation of the connectors 20, 30 once connected such that excessive rotational force may damage the connection.

The abovementioned examples of FIGS. 5-7E have been discussed in relation to a first connector 20, however it will be appreciated that the second connector 30 is similarly arranged so as to effectively form the connection across which the fluid paths 21, 22, 23 extend.

Figure 8:
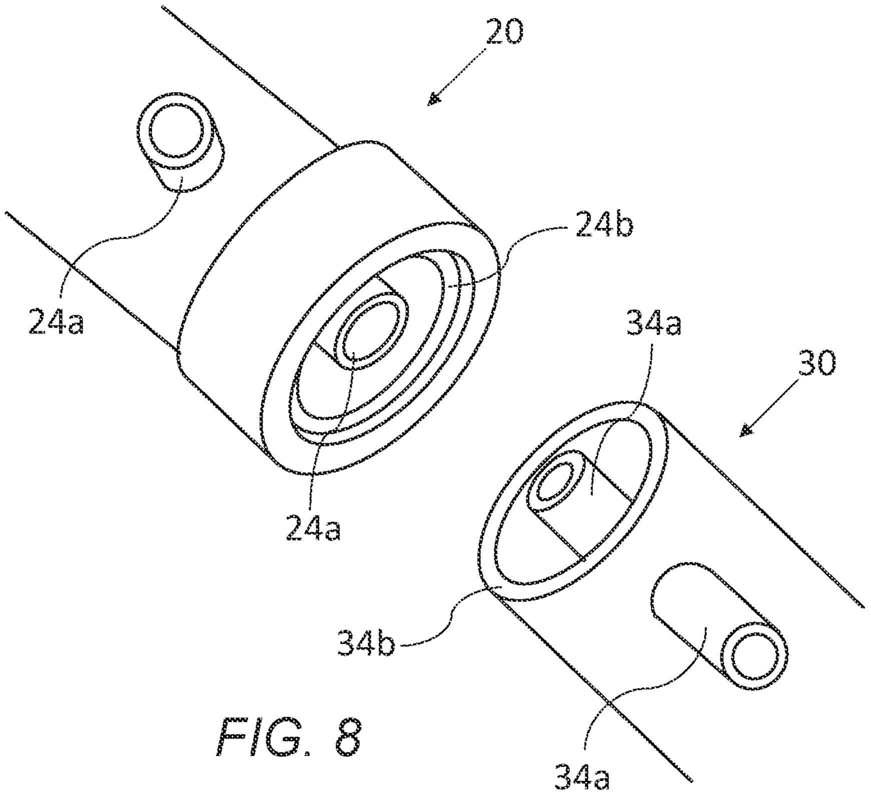
FIG. 8 shows an eighth example of a first connector and a second connector.

FIG. 8 shows an example that seeks to address the abovementioned challenges. In this example, the first conduit 24*a* and second conduit 24*b* of the first connector 20 are concentric. Similarly, the first conduit 34*a* and second conduit 34*b* are concentric. In particular, the first conduits 24*a*, 34*a* are surrounded circumferentially by the respective second conduits 24*b*, 34*b*. The connection can thereby be formed at any relative rotation between the first connector 20 and second connector 30, with no possibility of misalignment. This type of connection is achieved with the minimum number of interfaces (i.e. one per fluid path), reducing the number of seals required.

Figure 9:
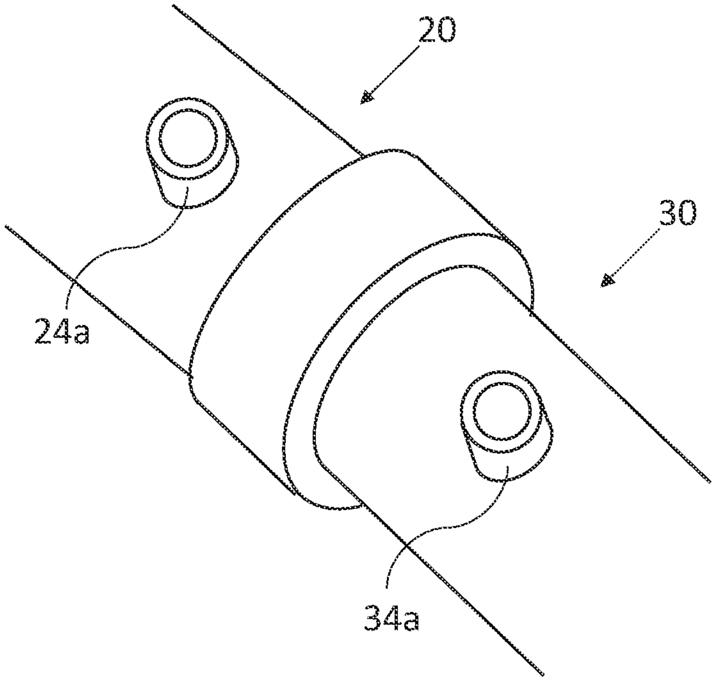
FIG. 9 shows the first connector attached to the second connector to form a connection.

Accessing the flow from the first, inner conduit 24*a* could be achieved by creating a junction, with the first conduit penetrating through the outer wall of the second, outer conduit 24*b* wall-such as shown in FIGS. 8 and 9.

Figure 10:
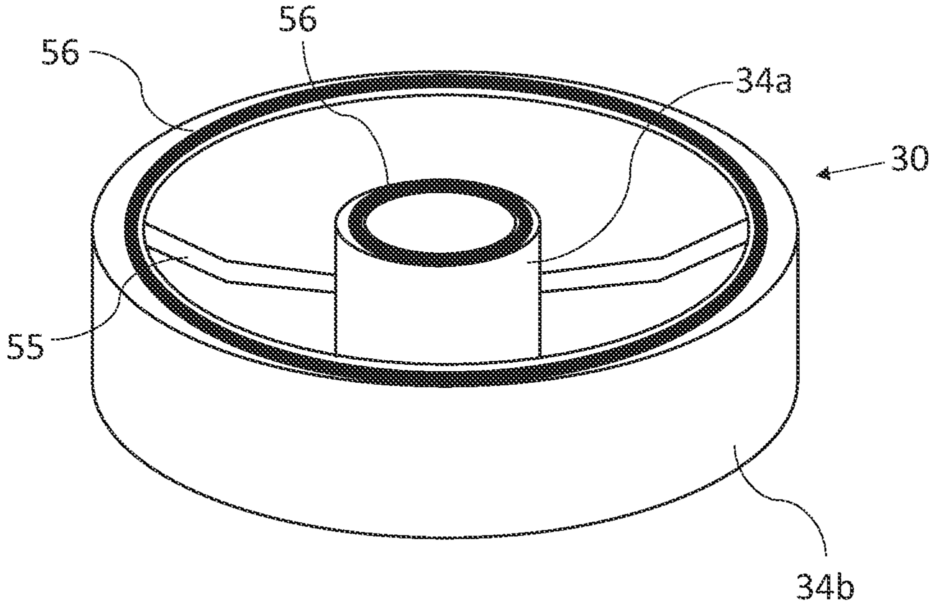
FIG. 10 shows an extruded feature holding the conduits of the first connector relative to each other.

The first, inner conduits 24*a*, 34*a* could be supported within the second, outer conduits 24*b*, 34*b* by a bracket or extruded feature 55 to hold it centrally within the assembly, such as shown in FIG. 10.

Figure 11:
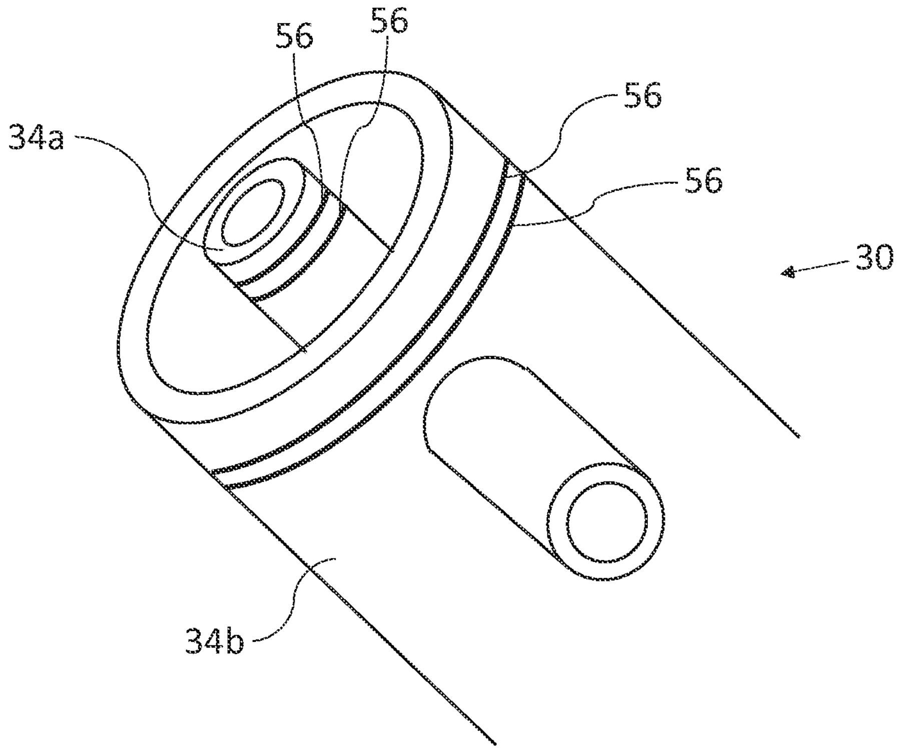
FIG. 11 shows a set of seals for sealing the connection.

It will be appreciated that a number of options for sealing the conduits 24*a*, 24*b*, 34*a*, 34*b* may be suitable. Sealing the respective conduits 24*a*, 24*b*, 34*a*, 34*a* may be provided by a circumferential seal 56 at an end of one of the respective connectors 20, 30 (see FIG. 10), although the quality of the seal would rely on the clamping force between the first connector 20 and second connector 30. Another option is to provide one or more seal rings 56 extending around the outer walls of the conduits 24*a*, 24*b*, 34*a*, 34*b*, in the same manner as piston rings (See FIG. 11).

Figure 12:
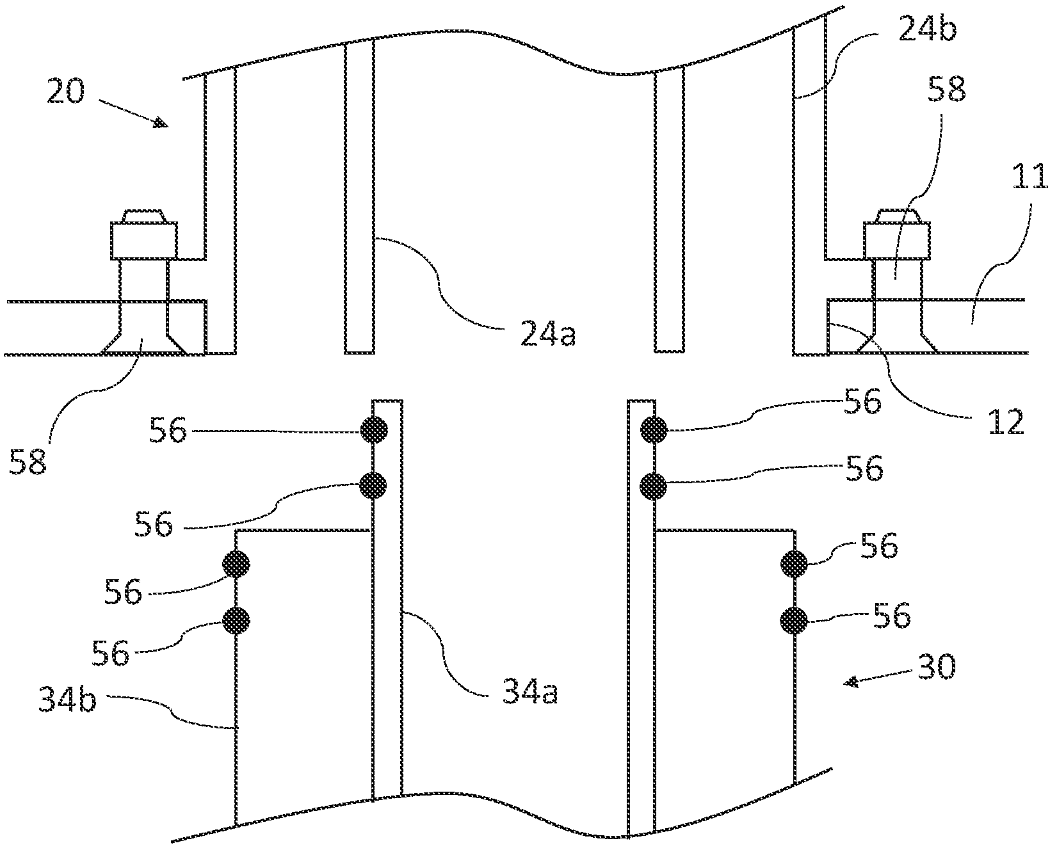
FIG. 12 shows the assembly of the first connector on an aircraft panel.

FIGS. 12 and 13 show an outer panel 11 in the form of a refuelling panel 11 defining a port 12 over which the first connector 20 is mounted. The first connector 20 may be attached to the panel 11 by any suitable means, such as the fasteners 58 shown in FIGS. 12 and 13. In this example, the seals 56 are located on the (male) second connector 30, although the seals 56 may be located at any suitable point across the connection. The advantage of locating the seals 56 on the second connector 30 is that this part is not normally attached to the aircraft 1 and is therefore easier to replace during standard maintenance of the ground equipment, with minimal disruption to the aircraft 1 operation.

An advantage of the example shown in FIGS. 8 to 13 is the compatibility with a rotation-based quick release mechanism due to the freedom of the first conduits 21, 31 to move rotationally relative to each other, and the freedom of the second conduits 22, 32 to move rotationally relative to each other, whilst connected. In alternative examples (such as those shown in FIGS. 5-7E), rotation of the conduits relative to one another will be limited to at least some degree.

Figure 14A:
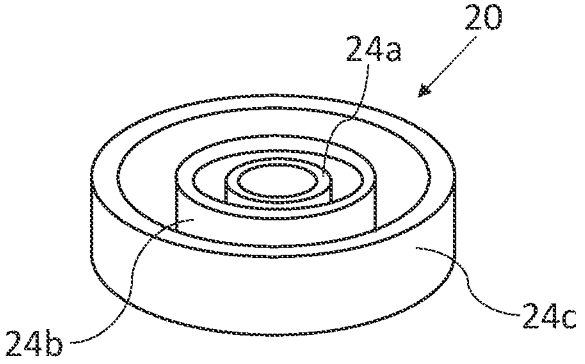
FIG. 14A shows a further example of a concentrically arranged first connector.

It will be appreciated that in further examples, additional concentric conduits may be provided. FIG. 14A shows an example in which a first, second and third conduit 24*a*, 24*b*, 24*c* are concentric with each other, such that the second conduit 24*b* circumferentially surrounds the first conduit 24*a*, and the third conduit 24*c* circumferentially surrounds the first and second conduits 24*a*, 24*b*.

Figure 14B:
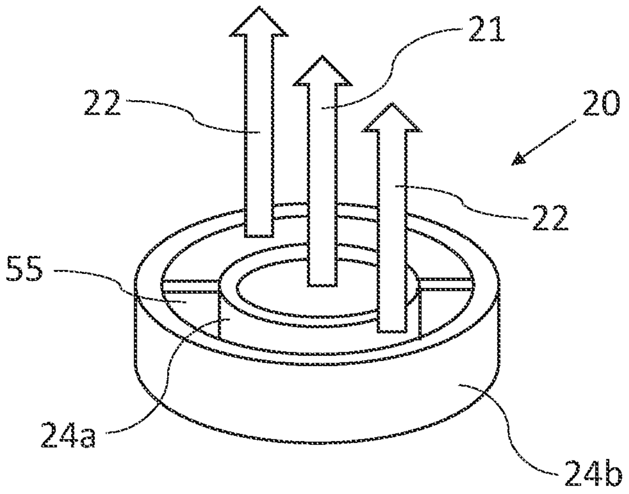
FIGS. 14B & 14C shows a further example in which an outer conduit of the first connector is divided into multiple channels.
Figure 14C:
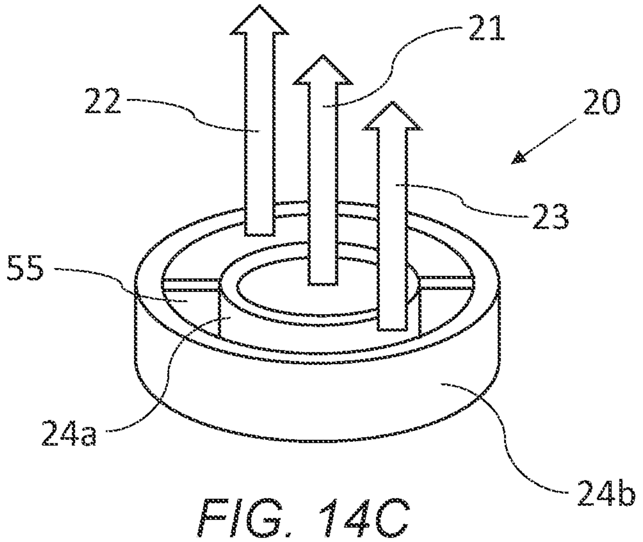

In some examples, one of the conduits 24*a*, 24*b*, 34*a*, 34*b* may be split into multiple sections. This split may be facilitated by the extruded feature 55 referred to in relation to FIG. 10 that fix the position of the first conduit 24*a* relative to the second conduit 24*b*. An example is shown in FIG. 14B, in which each half of the second conduit 24*b* forms part of the second fluid path 22. A similar example is shown in FIG. 14C in which each half of the second conduit 24*b* forms a separate fluid paths 22, 23.

In the abovementioned examples, the connection has been discussed in relation to the fuelling of an aircraft 1. It will be appreciated that the connection has many other uses in the context of transferring fluids to and/or from the tanks of an aircraft 1.

In some examples, fuels may be transferred from the fuel tanks 10*a*, 10*b* into the external fuel tanks 50*a*, 50*b*. Such defueling of the aircraft 1 may be necessary for several reasons including maintenance and inspection. It will be appreciated that the connection may be used for simultaneous fuelling and defueling, with a first fuel transferred to a first fuel tank 10*a* whilst a second fuel 10*b* is transferred out of the second fuel tank 10*b*. These operations may be performed simultaneously or sequentially.

Figure 15:
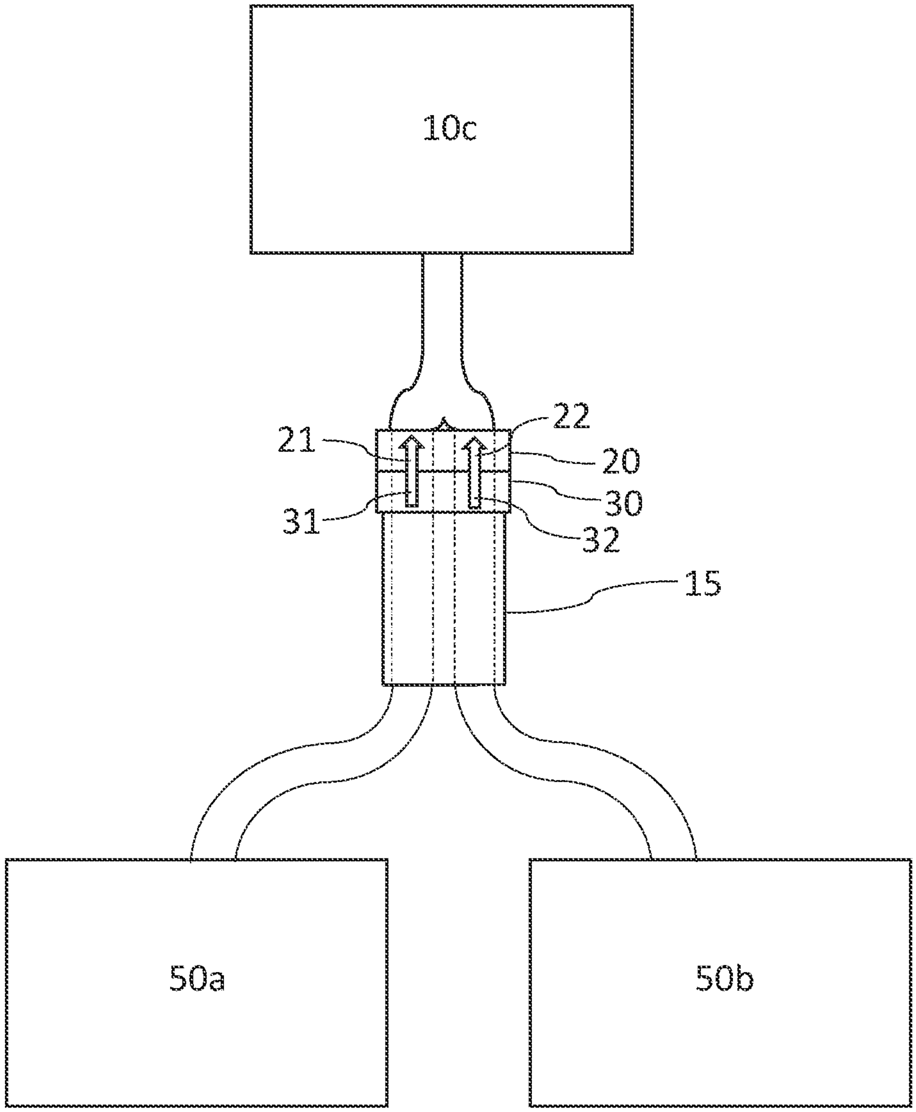
FIG. 15 shows an example in which the first and second fuel paths of the first connector converge towards a common fuel tank.

In some examples, the fluid paths 21, 22, 23 may converge at the first connector end or the second connector end. An example is shown in FIG. 15, in which the first and second fluid paths 31, 32 of the second connector 30 extend from separate external tanks 50*a*, 50*b*, whilst the first and second fuel paths 21, 22 of the first connector 20 converge towards a common fuel tank 10*c*. Such an arrangement may provide several functions. For instance, sustainable aviation fuel (SAF) may be combined with a jet fuel (e.g. jet A) upon fuelling the aircraft 1.

Alternatively, fuel additives may be added from a first tank 50*a* and/or second tank 50*b*, either to a common fuel tank 10*c* or to respective fuel tanks 10*a*, 10*b*.

The arrangement may provide further benefits beyond refuelling and defueling. For instance, due to the presence of oxygen and fuel vapour in a fuel tank 10*c*, the concentration of oxygen in the ullage is maintained below a specified value to reduce the risk of combustion. To do this, the air in the ullage of the fuel tank 10*c* may be displaced by oxygen-depleted air (e.g. nitrogen or nitrogen enriched air) supplied from a first external tank 50*a*. In this case, the connection can also be configured to allow fuel to be supplied from a second external tank 50*b*.

Similarly, leak testing of fuel tanks 10*c* typically involves the use of a tracer gas, such as helium or nitrogen. The present connection can allow the tracer gas to be delivered to the fuel tank 10*c* whilst also being capable of functioning as a refuelling connection.

The fuel tank 10*c* may build up a quantity of water within a given region of the fuel tank 10*c*. This may be due to several reasons such as condensation within the tank 10*c* or separation of residual water in the fuel itself. The fuel often has a lower density than water such that the water collects towards the bottom of the tank 10*c*. Consequently, fuel tanks 10*c* are generally drained of water during regular maintenance. In at least some examples, the water within the fuel tank 10*c* may be extracted using the same connection as the fuel. For example, the water may flow through a first fluid path 21, 31 and the fuel may flow through a second fluid path 22, 32.

Whilst the above examples all relate to transfer to fuel tanks, it will be appreciated that the applicability of the connection is wider than this.

Figure 16:
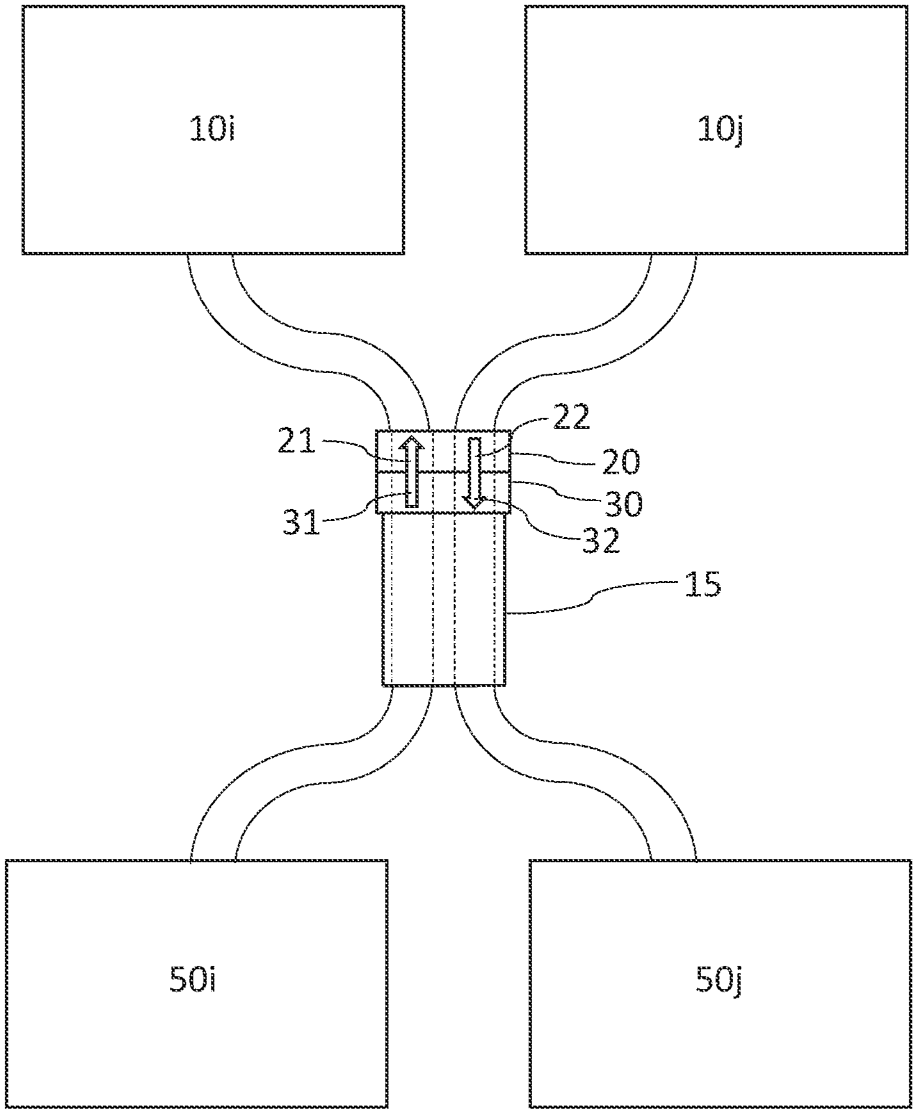
FIG. 16 shows an example in which water and waste are transferred through the connection.

FIG. 16 shows an example in which the first fluid path 21 of the first connector 20 extends towards a water tank 10*i* to transfer water from an external water tank 50*i*, and the second fluid path 22 of the first connector 20 extends towards an external waste tank 50*j* so as to transfer waste from an aircraft waste tank 10*j*. In this manner, the waste tank 10*j* may be emptied of waste whilst the water tank 10*i* is refilled. The connection may also provide a means of transferring other fluids such as hydraulic fluid and engine oil.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft, comprising:

a port over which a first connector is mounted for connecting to a second, complementary connector to transfer fluid to and/or from the aircraft, wherein the port is an opening in a side of the aircraft, wherein the first connector including a first fluid path extending from the port towards an aircraft fluid tank and a second, different, fluid path extending from the port towards an aircraft fluid tank, a first aircraft fluid tank, a second aircraft fluid tank, wherein the first fluid path extends to the first aircraft fluid tank and the second fluid path extends to the second aircraft fluid tank, and, wherein the first fluid path is concentric with the second fluid path.

2. The aircraft of claim 1, wherein the first fluid path is defined by a first conduit configured to connect to a first conduit of the second connector, and the second fluid path is defined by a second conduit of the first connector configured to connect to a second conduit of the second connector.

3. The aircraft of claim 1, wherein the cross-section of the first fluid path is different to the cross-section of the second fluid path.

4. The aircraft of claim 1, wherein the first fluid path is defined by a first conduit of the first connector, and the second fluid path is defined by a second conduit of the first connector, wherein the first conduit extends through an outer wall of the second conduit.

5. The aircraft of claim 1, wherein the first connector comprises an alignment pin or an alignment port for mating with a corresponding alignment port or alignment pin of the second connector so as to align the connectors.

6. The aircraft of claim 1, wherein the first and/or second aircraft fluid tank is an aircraft fuel tank.

7. The aircraft of claim 1, wherein the first fluid path and the second fluid path extend to a common fluid tank.

8. The aircraft of claim 1, wherein the first connector includes a third fluid path extending to an aircraft fluid tank.

9. A kit of parts comprising the aircraft of claim 1 and the second connector configured to releasably connect to the first connector to form a connection, the second connector including a first fluid path that upon connection to the first connector extends from the first fluid path of the first connector towards a first external fluid tank, and a second fluid path that upon connection to the first connector extends from the second fluid path of the first connector towards a second external fluid tank.

10. The kit of parts of claim 9, wherein the first connector and the second connector are configured such that:

the first fluid path of the first connector is unable to form a fluidically sealed path with the second fluid path of the second connector, and the second fluid path of the first connector is unable to form a fluidically sealed path with the first fluid path of the second connector.

11. The kit of parts of claim 9, wherein the second connector is a male connector and the first connector is a female connector configured to receive the second connector.

12. The kit of parts of claim 9, wherein the connection includes a locking mechanism configured to releasably fix the second connector relative to the first connector.

13. A method of transferring fluids to and/or from an aircraft, comprising:

providing an aircraft having a port over which is mounted a first connector, the first connector connected to a second connector to form a connection, the first connector including a first fluid path extending from the port towards an aircraft fluid tank and a second, different, fluid path extending from the port towards an aircraft fluid tank;

wherein the port is an opening in a side of the aircraft;

transferring a first fluid through the first fluid path to transfer the first fluid to or from the aircraft;

transferring a second fluid through the second fluid path to transfer the second fluid to or from the aircraft;

a first aircraft fluid tank;

a second aircraft fluid tank;

wherein the first fluid path extends to the first aircraft fluid tank and the second fluid path extends to the second aircraft fluid tank; and, wherein the first fluid path is concentric with the second fluid path.

14. The method of claim 13, wherein the first fluid path is defined by a first conduit connected to a first conduit of the second connector, and the second fluid path is defined by a second conduit of the first connector connected to a second conduit of the second connector.

15. The method of claim 13, comprising:

transferring the first fluid through the first fluid path to or from a first aircraft fuel tank, and transferring the second fluid through the second fluid path to or from a second aircraft fuel tank.

16. The method of claim 13, comprising:

transferring the first fluid through the first fluid path to or from an aircraft fuel tank, and transferring the second fluid through the second fluid path to or from the aircraft fuel tank.

17. The method of claim 13, wherein the first fluid is one of a first aviation fuel, a second aviation fuel, fuel additives, oxygen-depleted air, a tracer gas, hydraulic fluid, engine oil, or water, and wherein the second fluid is a different one of a first aviation fuel, a second aviation fuel, fuel additives, oxygen depleted air, a tracer gas, hydraulic fluid, engine oil, or water.

18. A method of transferring fluids to and/or from the aircraft according to the method of claim 13, comprising:

transferring water through the first fluid path towards an aircraft water tank, and transferring waste through the second fluid path from an aircraft waste tank.

* * * * *